W. LOUDEN.
LOAD BINDER.
APPLICATION FILED FEB. 15, 1909.

930,397.

Patented Aug. 10, 1909.

WITNESSES:-
Edw. C. Peterke
Roy Louden.

INVENTOR:-
William Louden.

UNITED STATES PATENT OFFICE.

WILLIAM LOUDEN, OF FAIRFIELD, IOWA.

LOAD-BINDER.

No. 930,397.  Specification of Letters Patent.  Patented Aug. 10, 1909.

Application filed February 15, 1909. Serial No. 478,030.

*To all whom it may concern:*

Be it known that I, WILLIAM LOUDEN, a citizen of the United States, residing at Fairfield, in the county of Jefferson and State of Iowa, have invented a new and useful Improvement in Load-Binders, of which the following is a specification.

My invention relates to devices for binding a load of hay or similar material on a wagon wherein a rope is used and a spear like instrument is inserted in the hay and the rope is wound around its upper end to tighten the rope and hold the hay from slipping off the wagon; and it consists of certain improvements whereby the device is rendered more perfect in its operation as well as cheaper to manufacture as will be explained by this specification and definitely set forth in the claims.

Figure 1:
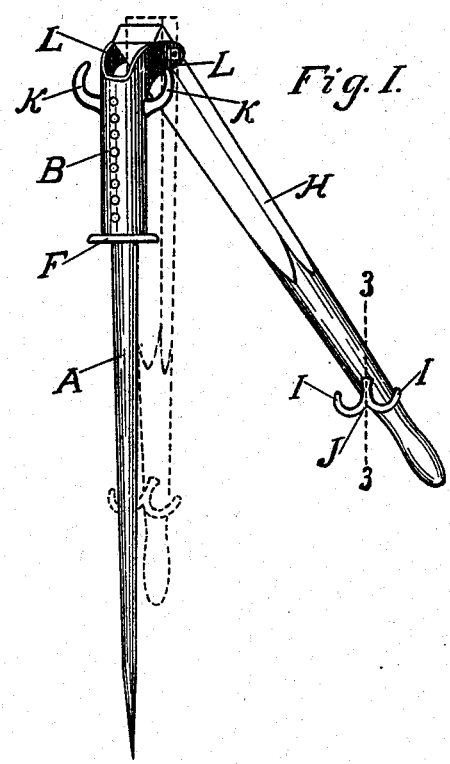
Figure 2:
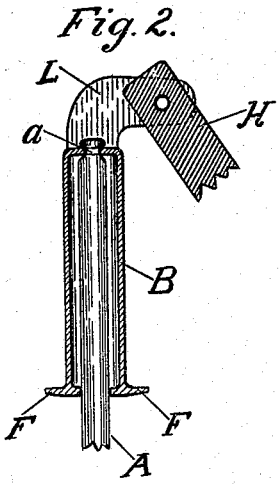
Figure 3:
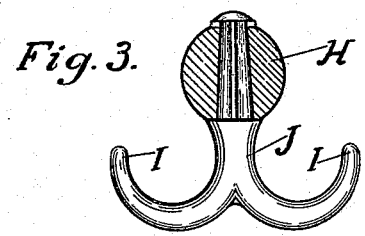
Figure 4:
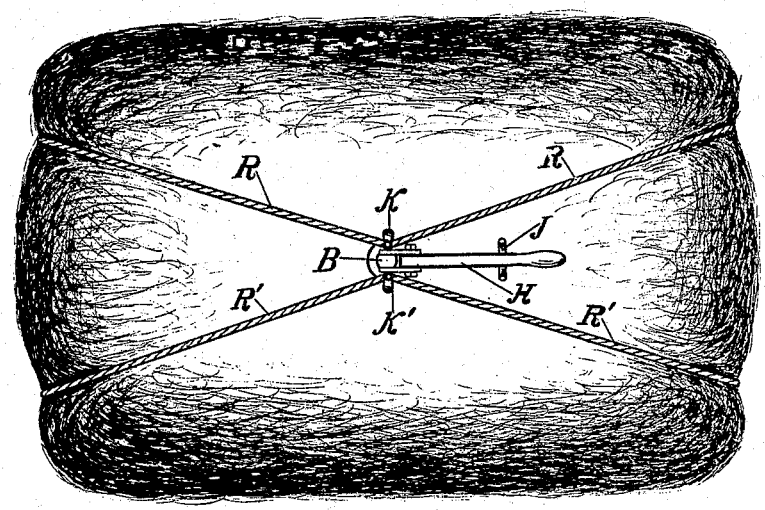

In the accompanying drawings forming a part of this specification, Figure 1 is a perspective of a load binder embodying my invention. Fig. 2 is an enlarged vertical section of the upper portion of the binder. Fig. 3 is an enlarged transverse section on line 3—3 of Fig. 1. Fig. 4 is a top view of a load of hay with the binder in position.

Referring to the drawings, A represents a pointed rod or spear to the upper end of which a winding drum B is secured. The drum is preferably made hollow and with a hole in its lower end to fit the body of the spear and a smaller hole in its upper end to fit a shouldered portion $a$ on the upper end of the spear which is headed, as shown in Fig. 2, to hold the drum and spear securely together.

On the upper end of the drum are two lugs L extended upwardly and then bent at substantially right angles to the body of the drum. These lugs are spaced apart a sufficient distance to admit a handle H which is pivoted at its inner end to the outer ends of the lugs so it may be folded substantially parallel with the spear as shown by the dotted lines in Fig. 1.

A hook J, preferably with double or oppositely extending ends I is secured to the lower side of the handle a sufficient distance from its outer end to permit a good handhold at the end of the handle. When the handle is folded (as shown by the dotted lines in Fig. 1) this hook will come in contact with the spear which will rest in the notch formed by the oppositely extending ends I, and when held in this position by a cord, or otherwise, will make a compact package for storing or shipping.

On the lower end of the drum is an annular flange F to prevent the spear from being inserted too far in the hay and also to assist in holding the rope on the drum. At the upper end of the drum adjacent to the lugs L are hooks K and K' the use of which will be hereafter explained.

The operation is as follows:—One or more small ropes, preferably two, R and R', long enough to reach over the load are fastened to one end of the wagon box or rack. The ropes are passed over the load and secured to the other ends of the wagon box or rack. They may be secured diagonally across the load, but it is preferable to pass them over the load on parallel lines. The spear of the binder is inserted in the center of the load as far as the flange F will permit it to go. The ropes R and R' are then drawn to the center and placed in the hooks K and K'. The binder is then turned around by means of the handle H which will wind the ropes upon the drum and will cause the load to be firmly bound and the binder will be held in this position by catching the hook J under one of the ropes K or K'.

By making the drum separate from the spear it can be made the proper size to wind the ropes to the best advantage without making it too heavy. It is preferable to make the spear of steel and the drum of malleable iron and by making them separate each may be made of the proper material and of the proper shape and size without being limited or controlled by the construction of the other.

The handle is preferably made of wood and the central or upper end of the hook J is passed up through the handle and is secured therein by riveting or otherwise. Being attached to the handle a distance from its free end a good hand hold is provided to operate the handle without interfering with the hook, and being double ended it will catch and hold on the ropes R or R' no matter in which direction it is turned.

In all it is a simple, cheap, convenient and effective device for the purpose intended. If desired a single rope can be used in place of two, but when this is done it should be passed over the load centrally. In this case only one hook K will be required and even when two ropes are used one hook will be sufficient to wind them on the drum.

What I claim is:—

1. In load binders, a spear, a drum made separate and secured to the upper end of the spear, means on the drum to hold a rope, a handle to turn the drum and wind the rope thereon, and means on the handle to catch on the rope and prevent the handle from turning backward.

2. In load binders, a spear, a hollow drum with a hole in the center of its upper and lower ends to admit the upper end of the spear and attach it thereto, means on the drum to hold a rope, a handle to turn the drum and wind the rope thereon, and means on the handle to catch on the rope and prevent the handle from turning backward.

3. In load binders, a spear, a drum made separate and secured to the upper end of the spear, lugs on the upper end of the drum spaced apart, a handle having its inner end inserted between the lugs and pivoted therein so as to wind the drum, means on the drum to hold a rope, and means on the handle to catch on the rope and prevent the handle from turning backward.

4. In load binders, a spear, a drum made separate and secured to the upper end of the spear, lugs on the upper end of the drum spaced apart and extended outwardly at substantially right angles to the body of the drum, a handle having its inner end inserted between the ends of the lugs and pivoted therein, means on the drum to hold a rope while being wound thereon, and means on the handle to catch on the rope and prevent the handle from turning backward.

5. In load binders, a spear, a drum having a flange on its lower end and lugs on its upper end and being made separate and secured to the upper end of the spear, a handle pivoted at its inner end between the lugs, means on the drum to hold a rope while being wound thereon, and means on the handle to catch on the rope and prevent the handle from turning backward.

6. In load binders, a spear, a drum having lugs on its upper end and outstanding hooks adapted to hold ropes below the lugs, and being made separate and secured to the upper end of the spear, a handle pivoted at its inner end between the lugs so as to turn the drum and wind the ropes thereon, and means on the handle to catch on the ropes and hold the handle in relation thereto.

7. In load binders, a spear, a drum made separate and secured to the upper end of the spear, and having an annular flange on its lower end, lugs on its upper end and outstanding hooks adapted to hold ropes below the lugs, a handle pivoted at its inner end between the lugs so as to turn the drum and wind the ropes thereon, and means on the handle to catch on the ropes and hold the handle in relation thereto.

8. In load binders, a spear, a drum on the upper end thereof, a handle pivoted to the upper end of the drum and a hook secured to the handle at a sufficient distance from the free end to permit a hand-hold beyond the hook.

9. In load binders, a spear, a drum on the upper end thereof, a handle pivoted to the upper end of the drum, and a double ended hook secured to the handle at a sufficient distance from the free end to permit a hand-hold beyond the hook.

10. In load binders, a spear, a drum on the upper end thereof, lugs on the upper end of the drum spaced apart, a handle having its inner end pivoted between the lugs so as to turn the drum, means on the drum to hold a rope while being wound thereon, and means on the handle to catch on the rope and prevent the handle from turning back.

11. In load binders, a spear, a drum on the upper end thereof, lugs on the upper end of the drum spaced apart and extended outwardly at substantially right angles to the body of the drum, a handle having its inner end pivoted between the ends of the lugs, means on the drum below the lugs to hold a rope while being wound thereon, and means on the handle to catch on the rope and prevent the handle from turning backward.

12. In load binders, a spear, a drum on the upper end thereof, lugs on the upper end of the drum spaced apart, a handle having its inner end pivoted between the lugs so as to turn the drum, an annular flange on the lower portion of the drum, means on the drum between the lugs and the flange to hold a rope while being wound thereon, and means on the handle to catch on the rope and prevent the handle from turning back.

WILLIAM LOUDEN.

Witnesses:
J. T. DAVIES,
LAURA J. KAMP.